(12) United States Patent
Castaño Marcos (10) Patent No.: US 12,437,889 B2
(45) Date of Patent: Oct. 7, 2025

(54) SYSTEM AND PROCEDURE FOR INSPECTION OF THE SURFACE OF A NUCLEAR FUEL ROD FOR THE AUTOMATIC DETECTION, LOCATION AND CHARACTERIZATION OF DEFECTS

(71) Applicant: ENUSA INDUSTRIAS AVANZADAS, S.A., S.M.E, Madrid (ES)

(72) Inventor: Jesús Castaño Marcos, Madrid (ES)

(73) Assignee: ENUSA INDUSTRIAS AVANZADAS, S.A., S.M.E, Madrid (ES)

( * ) Notice: Subject to any disclaimer, the term of this patent is extended or adjusted under 35 U.S.C. 154(b) by 58 days.

(21) Appl. No.: 18/553,664

(22) PCT Filed: Dec. 23, 2021

(86) PCT No.: PCT/ES2021/070933
§ 371 (c)(1),
(2) Date: Oct. 2, 2023

(87) PCT Pub. No.: WO2022/207946
PCT Pub. Date: Oct. 6, 2022

(65) Prior Publication Data
US 2024/0404719 A1 Dec. 5, 2024

(30) Foreign Application Priority Data

Mar. 31, 2021 (ES) .............................. ES202130293

(51) Int. Cl.
*G21C 17/06* (2006.01)
*G01N 21/95* (2006.01)
(52) U.S. Cl.
CPC ............. *G21C 17/06* (2013.01); *G01N 21/95* (2013.01); *G01N 2201/121* (2013.01); *G01N 2201/126* (2013.01)

(58) Field of Classification Search
CPC ...... G21C 17/06; G21C 17/017; G01N 21/95; G01N 21/952
See application file for complete search history.

(56) References Cited

U.S. PATENT DOCUMENTS

2017/0025195 A1   1/2017  Pineiro Fernandez
2022/0102018 A1*  3/2022  Embry ................. G21C 19/105

FOREIGN PATENT DOCUMENTS

WO        2009028883 A1    3/2009

OTHER PUBLICATIONS

F.J. Delacalle, "Generation of differential topographical images for surface inspection of long products", Journal, 2020, 967-980, vol. 17, Journal of Real-Time Image Processing.

* cited by examiner

*Primary Examiner* — Thanh Luu
(74) *Attorney, Agent, or Firm* — Hayes Soloway P.C.

(57) ABSTRACT

System and procedure for the inspection of the surface of a nuclear fuel rod for the automatic detection, localization and characterization of defects, comprising a plurality of point cloud acquisition systems and translation means for the nuclear fuel rod; where the system also comprises processing means capable of transforming the point cloud into a height map, locally thresholding for the segmentation of the height map and obtaining the discontinuities in said map, classifying the discontinuities in different geometric shapes to obtain the area, length, width, position and orientation, projecting the defect on the y-axis to obtain its depth and calculating the equivalent function and its second derivative to obtain the points where the depth of the defect is maximum.

10 Claims, 8 Drawing Sheets

SYSTEM AND PROCEDURE FOR INSPECTION OF THE SURFACE OF A NUCLEAR FUEL ROD FOR THE AUTOMATIC DETECTION, LOCATION AND CHARACTERIZATION OF DEFECTS

CROSS-REFERENCE TO RELATED APPLICATIONS AND PRIORITY

This patent application claims priority from PCT Application No. PCT/ES2021/070933 filed Dec. 23, 2021, which claims priority from ES Patent Application No. P202130293 filed Mar. 31, 2021.

TECHNICAL SECTOR

The invention belongs to the sector of the manufacture of nuclear fission fuel for nuclear reactors and specifically to the field of inspection equipment for fresh fuel rod (without irradiation) or tube made of zirconium alloys.

BACKGROUND OF THE INVENTION

In nuclear reactors, fuel elements are used which comprise a plurality of nuclear fuel rods, arranged in a matrix fashion, in rows and columns. These rods are made of metal alloys including more than 95% zirconium, which characterizes them with a very specular appearance. They include fuel pellets, in this case uranium (U), in the form of uranium oxide ($UO_2$), normally enriched up to 4.9% in $^{235}U$.

To avoid possible failures in the operating reactor, leaks of radioactive material (uranium and other fission products) in the plant circuit and, consequently, loss of productivity and increased radiological risk, there are quality requirements for manufacturing of the fuel rod in terms of notches, cracks and pores, all of them, on its surface. The most restrictive case occurs in certain fuel rods for PWR reactors, in which the maximum allowed depth of a defect is 25 μm and the surface area is 2 $mm^2$.

In the manufacturing process, the conventional way to verify that these quality requirements are met is by visual inspection of the entire rod surface by a qualified inspector. This inspector, subjectively, although with the help of visual patterns, inspects the surface of the rods and selects them as good or bad based on the defects found. Manual inspection, of course, lacks the precision necessary to characterize defects in depth and area.

Another way of identifying whether or not the rod has defects and where they are found along it, without characterizing them, is with eddy current equipment. Currently, with these systems, defects have been detected with an accuracy of approximately 50 μm, but without being able to characterize them in depth along the defect, area and orientation.

The interest shown by the nuclear fuel manufacturing industry in a technology for the characterization of defects on the surface of the fuel rod is widespread. However, the attempts made so far have not yielded the intended results, and there is no evidence of any system that, in addition to inspecting the entire rod surface reliably and automatically, offers information and in-depth characterization of the defects found with sufficient accuracy.

SUMMARY OF THE INVENTION

The object of the present invention is to provide a system and procedure that allows the automatic detection and location of surface defects of a nuclear fuel rod, in addition to their characterization. For this, the system proposes means of translation of the fuel rod and a plurality of systems for acquiring a point cloud on the surface of the rod, where each acquisition system is made up of a laser, a camera and a point acquisition card. The invention further comprises processing means capable of transforming the point cloud into a height map, locally thresholding for the segmentation of the height map and obtaining the discontinuities in said map, classifying the discontinuities in different geometric shapes to obtain the area, length width, position and orientation, projecting the defect on its y-axis to obtain its depth and calculating the equivalent function and its second derivative to obtain the points where the depth of the defect is maximum. Optionally, the processor can also eliminate voids, noise and/or edges, discontinuities due to vibrations or reflections.

BRIEF DESCRIPTION OF THE FIGURES

In order to help a better understanding of the characteristics of the invention and to complement this description, the following figures are attached as an integral part thereof, the character of which is illustrative and not limiting.

DETAILED DESCRIPTION

By means of the procedure and system that the invention proposes, the problems previously exposed are solved in a satisfactory way.

The invention relates to a method and system for the inspection of the surface of an unirradiated fission nuclear fuel rod and the detection, location and characterization in width, length and depth of its defects. For the inspection, 3D vision technology using laser triangulation is used. A defined number of point cloud acquisition systems (1) are used, pre-calibrated and adjusted, each consisting of a linear laser beam (3), an optical sensor (4) and an acquisition card (5).

The operation of the acquisition system consists in that, at a certain point in time, the linear laser beam (3) falls on the object to be inspected (2), previously placed in the field of view, which reflects, diffusely, the laser light. At the same instant of time, this light is received by the optical sensor (4) which is at a given distance and angle. The sensor takes a photo from which, on the one hand, the distribution of intensities of the diffuse light reflected by the laser is obtained, from which it extracts a profile (6), on the other the 2D image and finally a stamp with the instant of time, called timestamp; this information is saved in a three-channel RGB image (red: profile, green: 2D image, blue: time stamp). Repeating the photographing process over time as the fuel rod is moved results in a profiling along the axis of the rod (Y-axis). These profiles form a point cloud (7). Finally, in order to work this point cloud as a 2D image, it is transformed into a height map, making each point of the cloud correspond to a pixel, in such a way that the X, Y coordinates of the cloud will correspond to the height and width of the image and the Z coordinate of the cloud will correspond to a gray level from 0 to 255.

Preferably, the type of laser will be blue light, with a shorter wavelength (~ 470 nm) and therefore less penetration into the object to be measured and greater focus than other types of lasers such as red (~700 nm). This minimizes the light reflected back to the detector, generating up to three times less noise than a red one and greatly increasing accuracy.

Figure 2A:
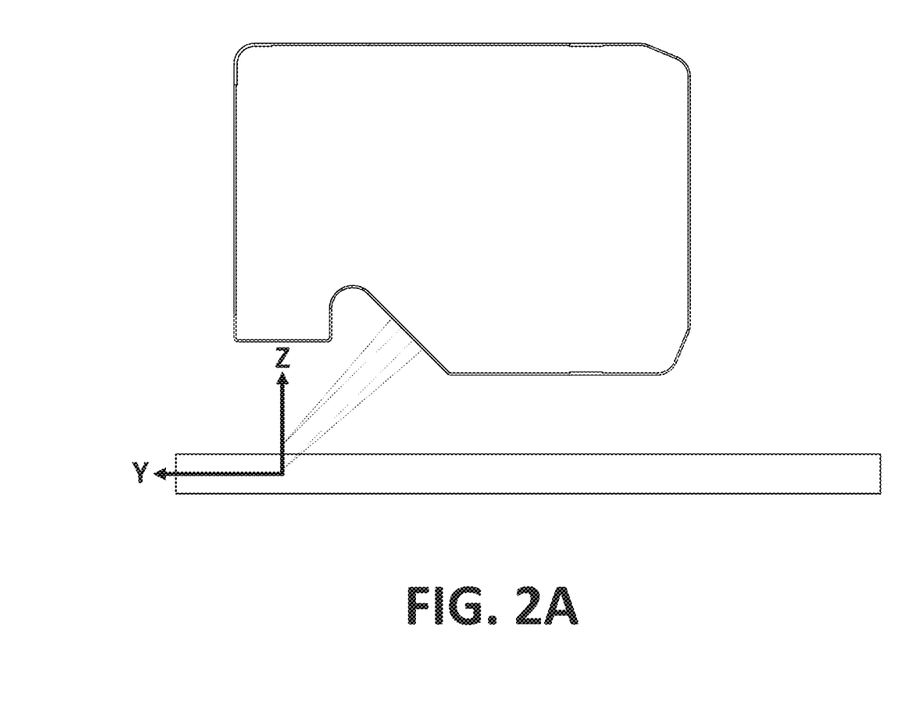
FIGS. 2a and 2b show an acquisition system in relation to the rod and its coordinate system.
Figure 2B:
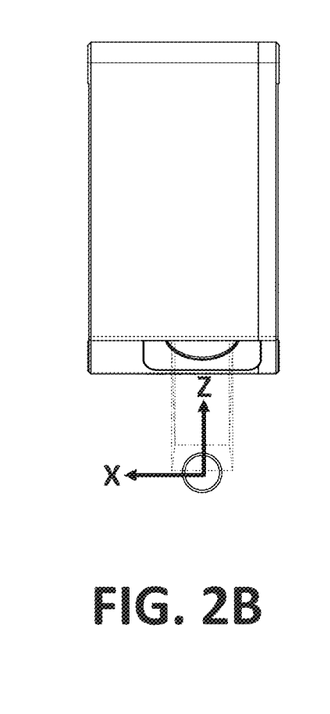
Figure 4:
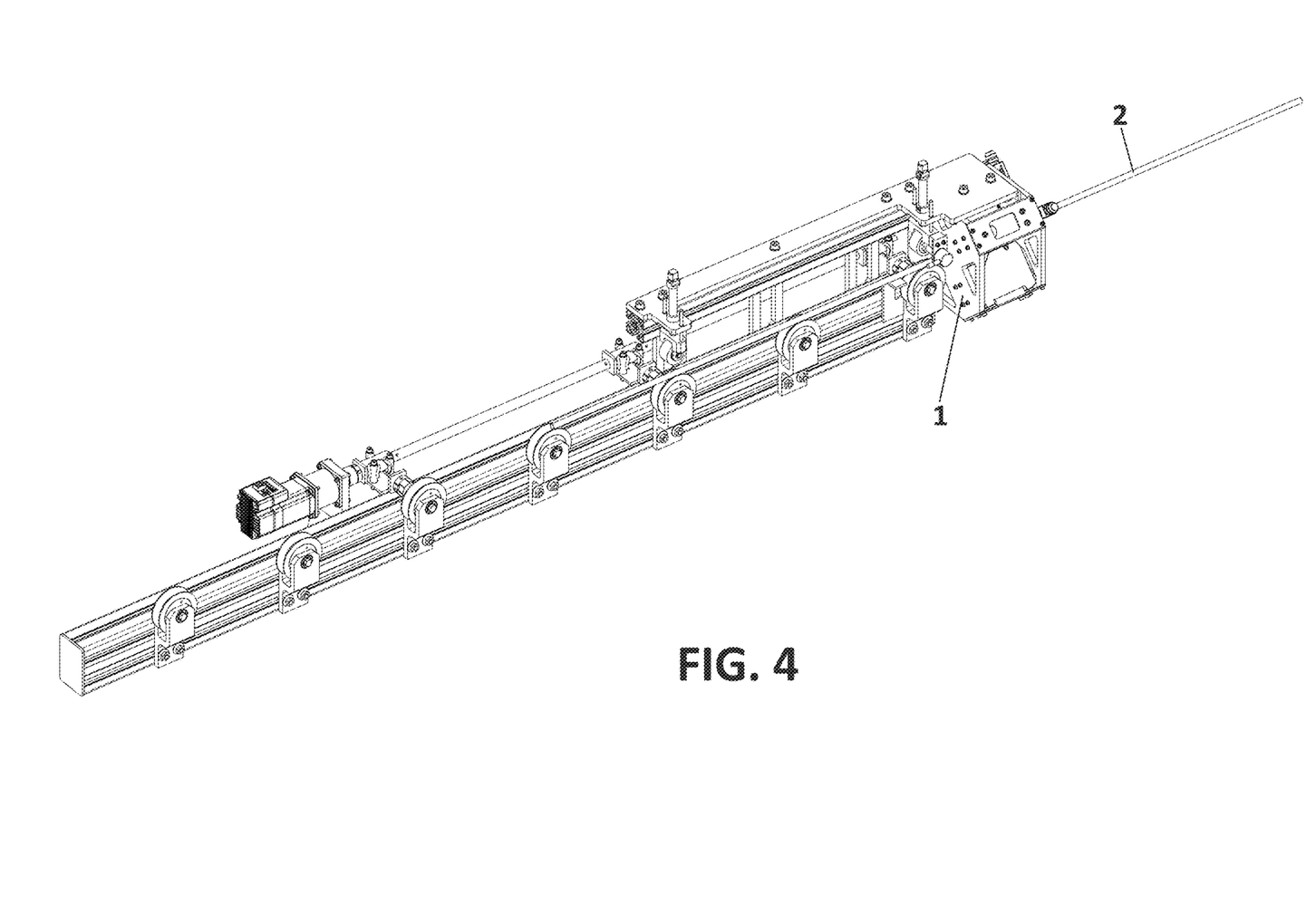
FIG. 4 shows a perspective view of the rod translation system. In the implementation shown, the system comprises motorized wheels, although other means of translation could be used.

According to the invention, the point cloud of the surface (7) is treated by means of processing (PC, industrial computer, tablet or any means with a processor) and by means of a series of specifically developed artificial vision operations, the defects on the surface of the rod (2) are automatically detected, measured and classified, according to the method of the present invention. For this, a reference system is used in such a way that the axis of the cylinder that makes up the rod is the Y axis, and the axes transverse to it at each instant, the X and Z axes (FIG. 2). According to the invention, the fuel rod moves linearly along the Y axis (FIG. 4) and the acquisition systems are placed transversely, the linear laser beam corresponding to the XZ plane. Thus, the profile (6) obtained by each of the optical sensors (4) of the acquisition systems (1) at each instant of time will be the arc of circumference within the sensor's field of view, corresponding to the section of the rod by the XZ plane coinciding with the laser beam at that particular instant. The field of view of the camera is a trapezoid corresponding to the triangulation of the field of the optical sensor (rectangular) in the XZ plane that contains the laser beam.

Figure 1A:
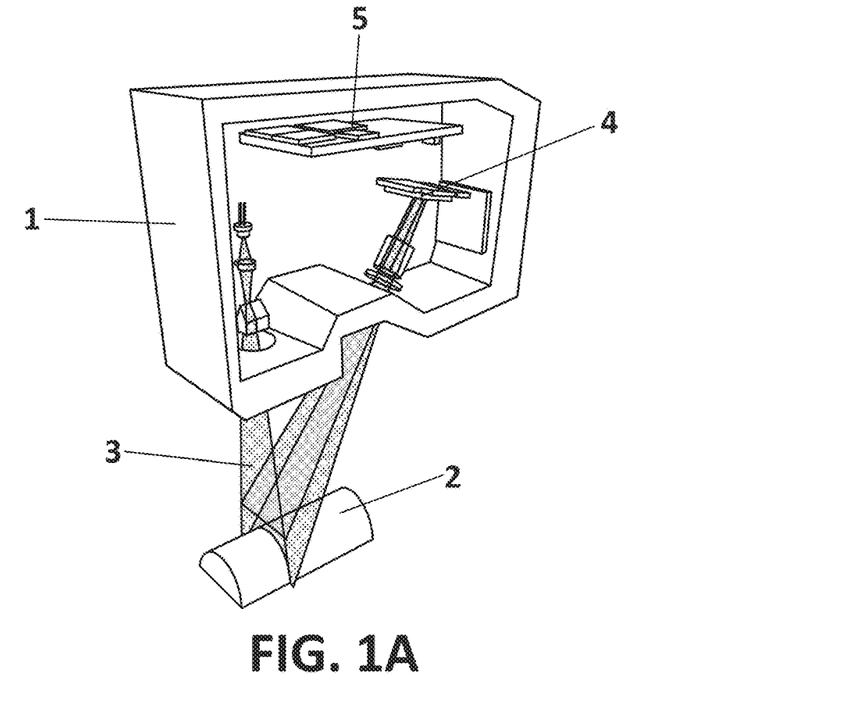
FIGS. 1a, 1b and 1c show a view of the point cloud acquisition system according to the invention.
Figure 1B:
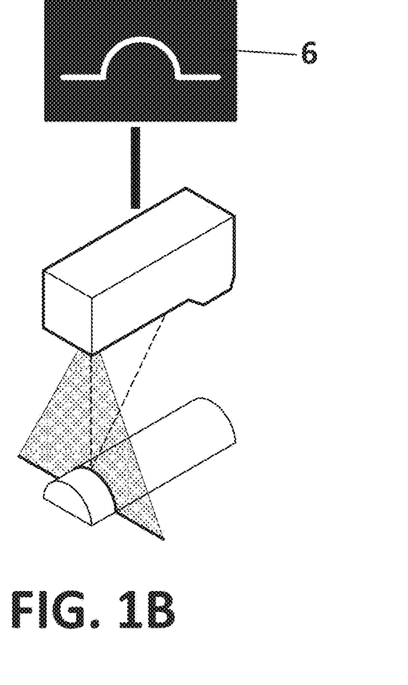
Figure 1C:
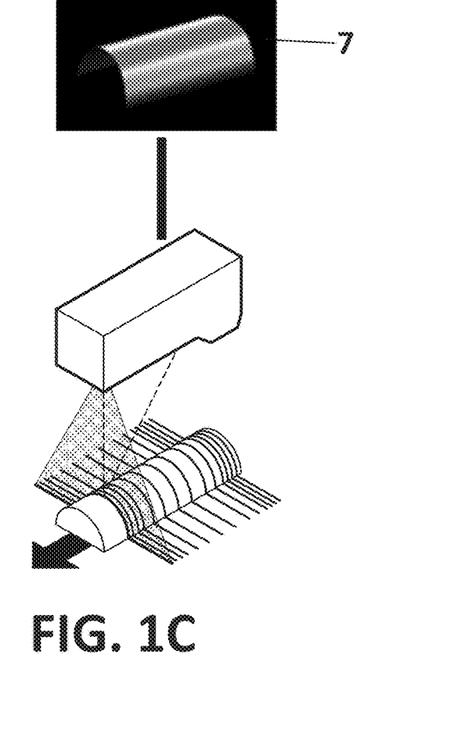

During the linear movement of the rod, each acquisition system obtains profiles with a certain frequency, and the achievement of these profiles along the Y axis forms the point cloud corresponding to the surface of the rod (FIG. 1). According to the invention, by means of a defined number of systems to cover the entire surface of the rod, since it does not rotate on itself, a number of point clouds corresponding to the number of systems are obtained, covering the entire surface (360°) of the rod the union of all the point clouds.

Furthermore, according to the invention, the acquisition systems, with a determined frequency, obtain profiles that accumulate one after the other as the rod moves, with a distance between profiles as a function of the speed of the rod.

The defects being detected and measured will have depths greater than or equal to 25 µm, therefore, the ideal Z precision of the measurement device will be of the order of 0.5 µm (25/50). The diameter of the rod (Ørod) varies from 8.9 to 10.7 mm and its length from 1500 to 4510 mm, depending on the nuclear model to be inspected (PWR, VVER or BWR). For an equivalent inspection and according to the invention, the number of acquisition systems for the 360° inspection of a cylindrical rod, with a minimum number of 3, according to calculations would be:

$$Adq.\ Syst. = f(\text{Ørod}) = |3 + 0.1\text{Ørod}|$$

According to the invention, this formula is valid for the given value of precision in Z required (0.5 µm), taking into account that the acquisition systems are identical or have similar characteristics. When determining this formula, in addition to the diameter, the sensor's field of view and the speed of the rod have been taken into account.

The field of view of each acquisition system is limited and varies depending on the precision in Z, the higher the precision, the smaller the field of view and the smaller the dimensions of the trapezoid that composes it. It occurs in a similar way with speed, the ends of the curve that make up the profile, less perpendicular to the acquisition system, require a longer exposure time than if it were a flat and perpendicular surface, therefore, the longer the exposure time, the shorter will be the sample rate. In this way, there will be a maximum speed at which it can be inspected and below this, at a lower speed, a greater number of profiles will be obtained and consequently the precision of the point cloud on the Y axis will be greater.

Figure 3A:
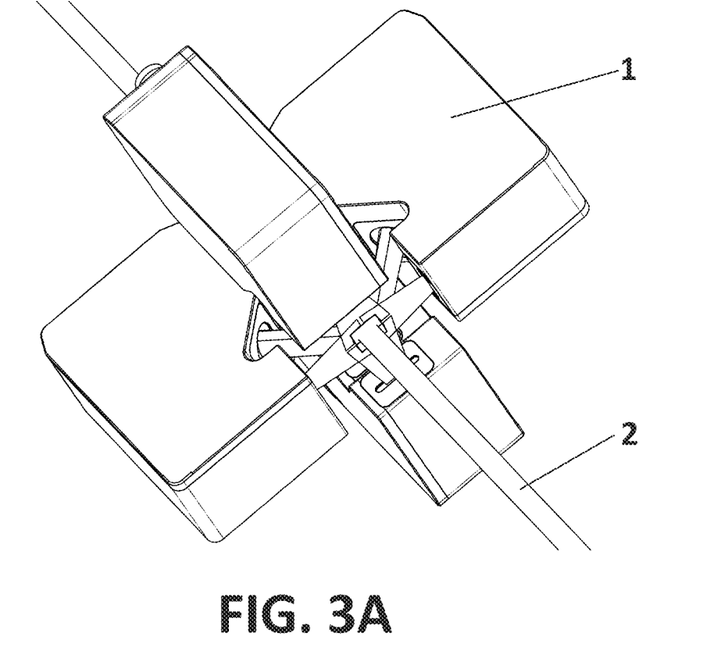
FIGS. 3a and 3b show a perspective and an elevation view of an embodiment in which the number of point cloud acquisition systems is four.
Figure 3B:
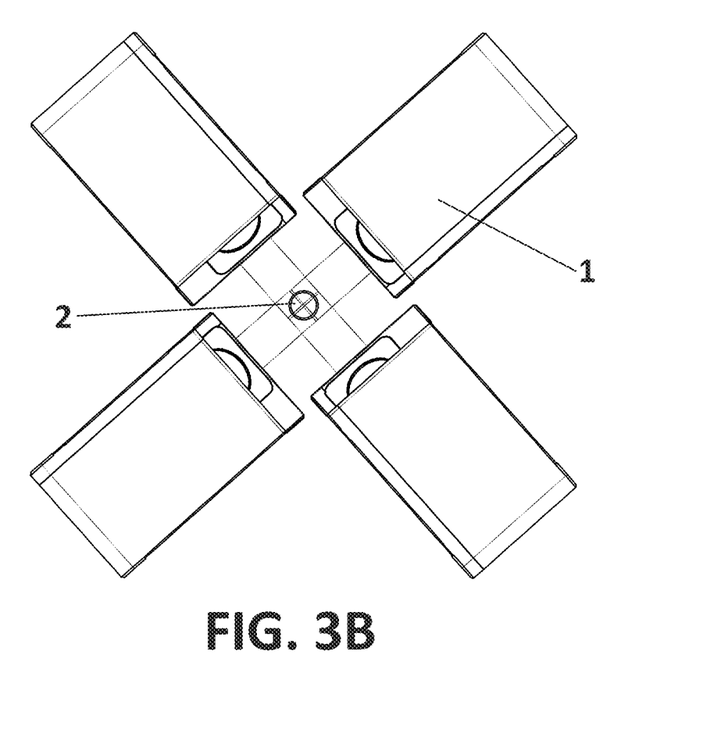

In this way and in accordance with the previous formula, the number of acquisition systems for a fuel rod (PWR, VVER or BWR) with a diameter between 9.5 and 10.7 mm will be at least 4 (FIGS. 3a and 3b):

$$Adq.\ Syst. = |3 + 0.1{}^*10.7| = |4.07| = 4$$

The invention may further comprise a support structure for the acquisition systems through which the fuel rod passes. Both at the entrance and at the exit of said structure, there may be separate conical nylon centering devices, to keep the distance of the acquisition systems from the rod controlled at all times during the inspection and to limit unwanted vibrations. This structure is robust enough so that there are no variations in the position of the acquisition systems, which will be placed and screwed (or fixed by a similar method) to the cross-shaped structure, transversely to the axis of the rod, in the same plane, but 90° apart from each other (in the case of four). The correct positioning of the acquisition systems with respect to the rod will allow measurements with acceptable quality and reliability to be achieved. In a preferential example, this structure is designed with the aim of evacuating by convection as much heat as possible generated by the acquisition systems in operation, made of conductive materials such as aluminum and with the least amount of air chambers possible.

Furthermore, this structure can comprise a system, for adjustment and casing (by means of gauges, micrometers or the like), to appreciably vary the perpendicular distance of the acquisition system to the rod. It can also have a similar system to adjust the entire set of support structure and acquisition systems, with the possibility of turning to adjust the alignment of the set with respect to the rod.

The apparatus may comprise, for the linear movement of the rod, a system of motorized rollers or belts (FIG. 4) on which the rod rests. According to the invention, the longitudinal speed component of the speed will be obtained by means of an idler-shaped probe, closest to the position of the acquisition systems, which copies the movement of the rod at all times and on the that an encoder is located that measures the speed of the rod, necessary to establish the sampling frequency so that it is constant throughout the rod and to build the point cloud in a homogeneous way.

The invention also has a specific hardware system for coordination, synchronization and communication between the acquisition systems to which they are connected. This hardware provides a single point for the supply of power, safety, trigger and digital signals; necessary for the correct operation of the system. Finally, the encoder and the processing means (PC, industrial computer or tablet) are connected to this synchronization hardware in which the point cloud processing is to be carried out. This synchronization hardware outputs the N point clouds, one for each acquisition system, or a joint point cloud joining some clouds to others in the overlapping areas.

The information acquired is a 16-bit root image with 3 channels (red, green and blue) in which all the 2D and 3D information is stored.

Figure 5:
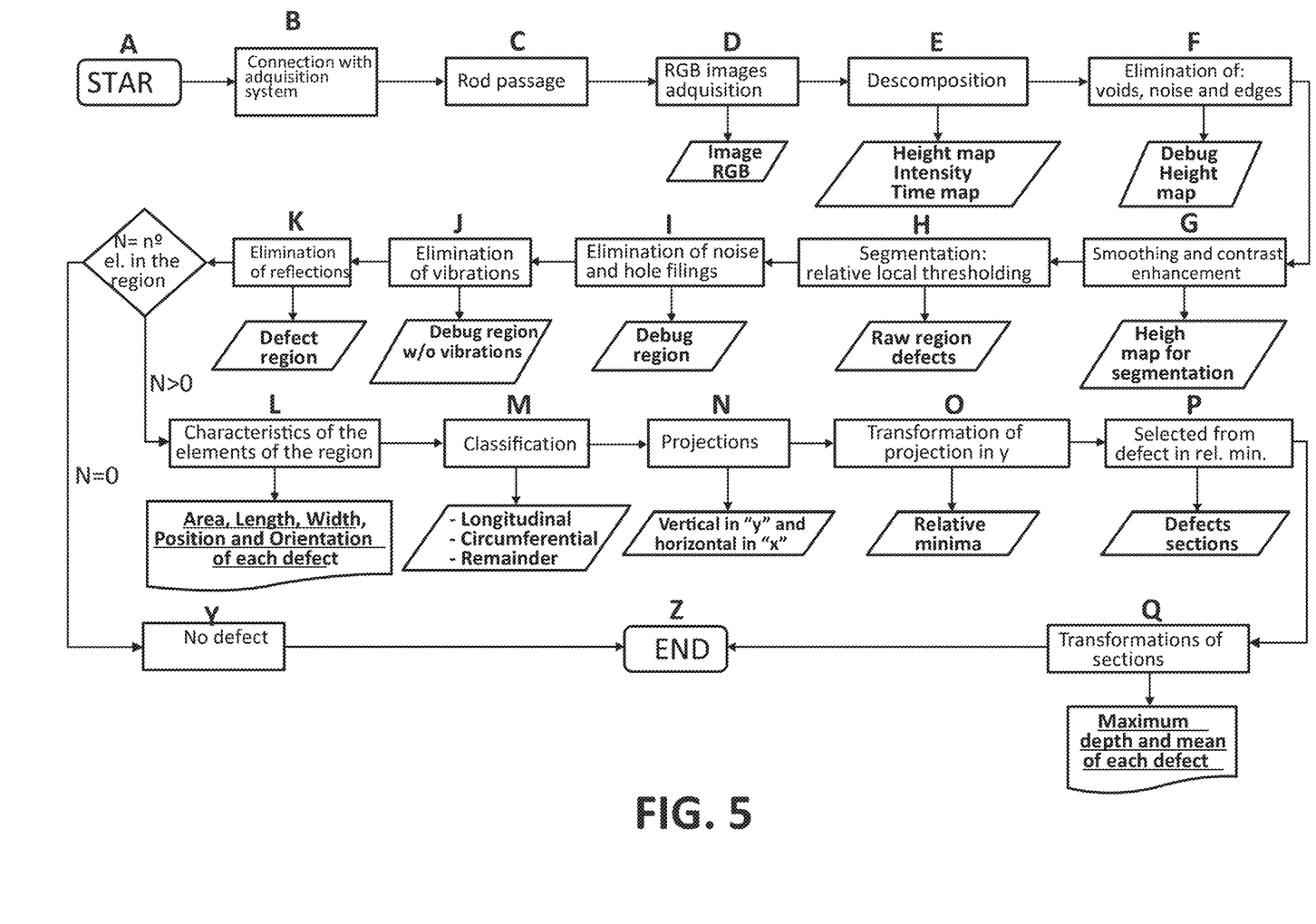
FIG. 5 is a flow chart of the method of the invention.

According to an implementation of the invention, the diagram of operations carried out in the processor is indicated in FIG. 5.

Each of the stages according to the invention and its various implementations are detailed below, shown in FIG. 5.

Stages from A to E: A series of procedures are available for controlling the acquisition system by means of the software and the decomposition of the raw image of 3 channels per pixel (RBG) acquired by the optical sensor (4) and the acquisition card (5) in three images (one per channel): (1) height map, (2) 2D intensity image (compendium of 2D photographs) and (3) timestamps.

Stage F: elimination of voids, noise and edges. With the input of the height map, the processor can optionally perform operations that eliminate noise, identifying those discontinuities found with an area value less than a possible real defect in the rod. It can also fill holes of an area smaller than a defined one, with the average value of the pixels that surround this hole. In addition, the edges can be smoothed, eroding them and leaving the image more homogeneous. These steps, although not essential, have the advantage of eliminating future false defects and speeding up both the subsequent treatment of the image and the characterization of the defects.

Stage G: smoothing and contrast enhancement. The processor will be able to smooth and/or flatten the projection of the height map, which in the case of a cylinder will be the equivalent of a circle. To do this, a gamma correction is applied that allows the curvature to be attenuated and the contrast to be increased.

Stage H: Segmentation. Segmentation consists of the location within an image of areas (set of pixels, spots, areas or portions) with the same characteristics or different characteristics from those of their neighbors. With the height map corrected and the contrast increased, the processor performs operations that, through thresholding, detect the discontinuities in the height map. It is necessary to apply a local or adaptive thresholding, since the background of the height map of a cylinder is not constant (in this case it does not have the same Z because it is curved) and the contrast of the defects varies in the image, so standard thresholding would work well for one part of the image, but for the rest of the image, the segmentation would not be adequate. Therefore, it is necessary to examine the image intensities in the vicinity of each pixel (or set of pixels) and select a threshold by means of the mean value of the local intensity distribution, obtained from the smoothed image. In this way, a region of "spots" is obtained, which will be the supposed region of defects of the rod. This segmentation step is essential in the invention, since it is by means of which the defects are extracted as a function of their depth, the detection and location of the defects being the objective of the invention.

Stage I: elimination of noise and hole filling. First, from the raw region of defects, the "spots" that are smaller than a possible real defect are eliminated, discarding false defects, and the small internal holes of the "spots" that make up the region are filled.

Stage J: Elimination of vibrations. Advantageously, the processor will be able to eliminate the vibrations of the rod, if any. This is done by transversely joining the regions obtained from the segmentation if they are a few mm apart and identifying as vibration those regions (or joining of regions) that are perfectly perpendicular to the rod and of a length equal to or similar to the diameter.

Stage K: Elimination of reflections. In addition, operations may be carried out that eliminate discontinuities due to laser reflections in the rod material, identifying if the mean value of Z has a value above that which the rod surface should have and eliminating said discontinuity, since defects such as indentations, pores or notches will always have a Z value lower than that of the rod surface. Obtaining the definitive region of rod defects.

Stage Y: object without defects. In case of obtaining an empty region of stage K, the process will have finished and the result will be, in this case, a good rod without defects.

In the case of not obtaining an empty region in stage K, the process continues with stage L.

Stage L and M: classification and characteristics of the elements of the region. Once those discontinuities that may correspond to actual defects in the rod have been identified, the processor, by means of the geometric shapes inscribed and circumscribed in the discontinuities found, can classify them as longitudinal, circular or without a defined orientation. Once the possible defects have been classified, their maximum length and width dimensions will be measured, regardless of their orientation. In this way, the first defect characterization data is obtained: area, length, width, position and orientation.

Figure 6A:
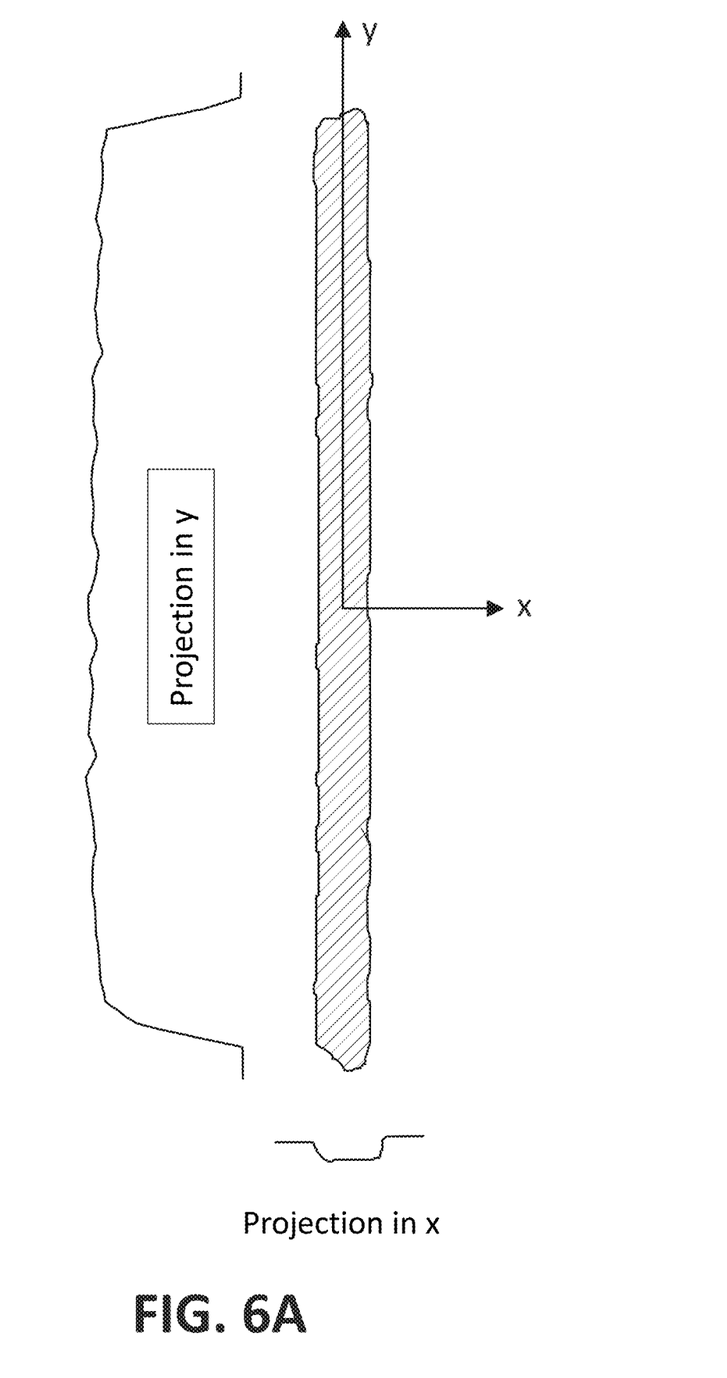
FIGS. 6a and 6b show the x and y axes of the defect and the projection on the y axis of a longitudinal defect and the obtaining of the minima by means of the second derivative.

Stage N: projections of the defect. The default axes are represented by the y axis, the major axis of the ellipse that circumscribes it, the x axis, the minor axis of this ellipse, and the z axis, transverse to the x and y out of the surface of the rod. In this stage the projection in y is extracted. This step is fundamental in the invention, since the projection in y indicates the places in which the defect has greater depth (FIG. 6a).

Figure 6B:
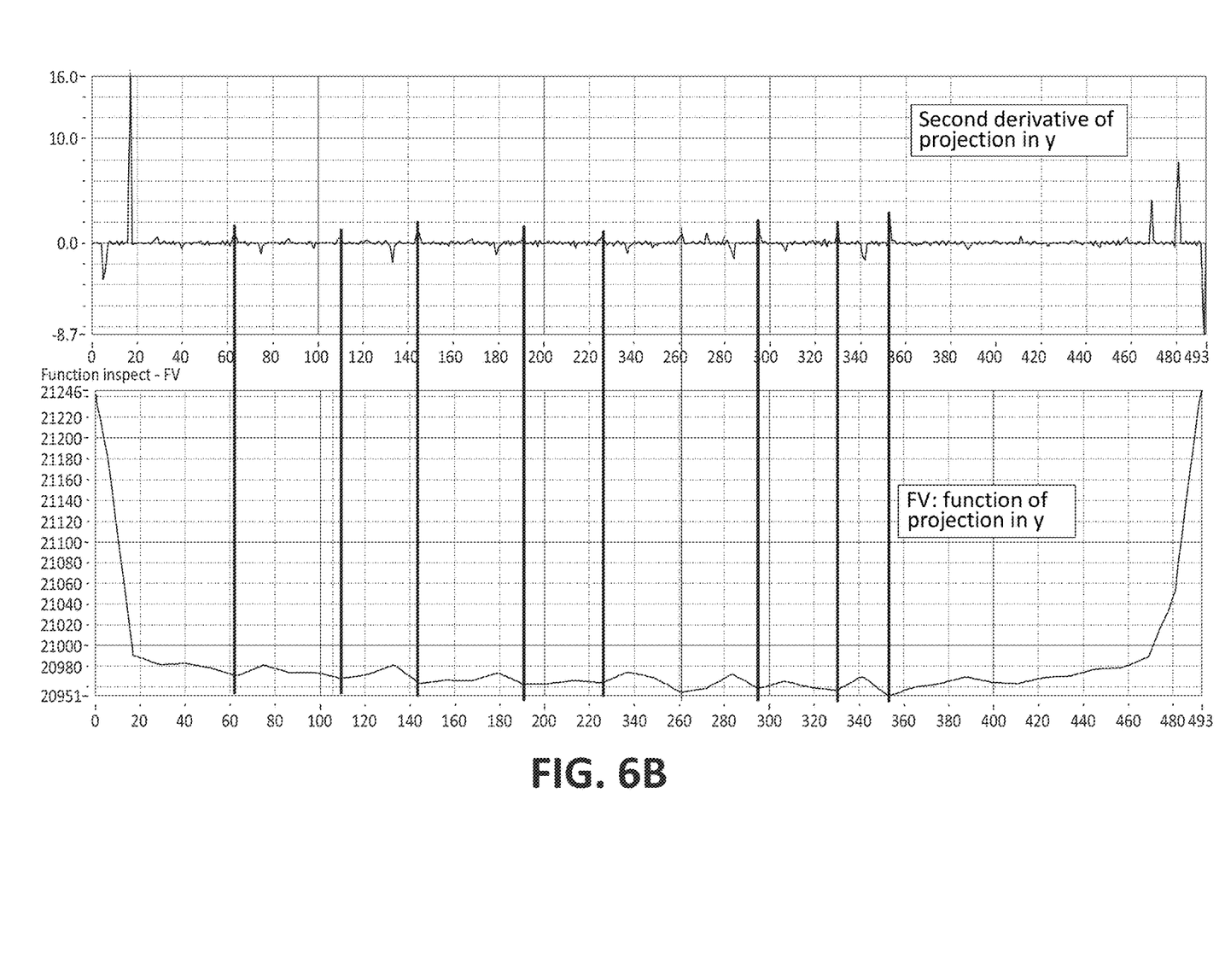

Stage O: transformations of the vertical projection. The equivalent function and its second derivative are obtained from the vertical projection. Thus, the relative minima of the horizontal projection, which is where the depth of the defect is greatest, are given by the maxima of the second derivative (FIG. 6b).

Figure 7:
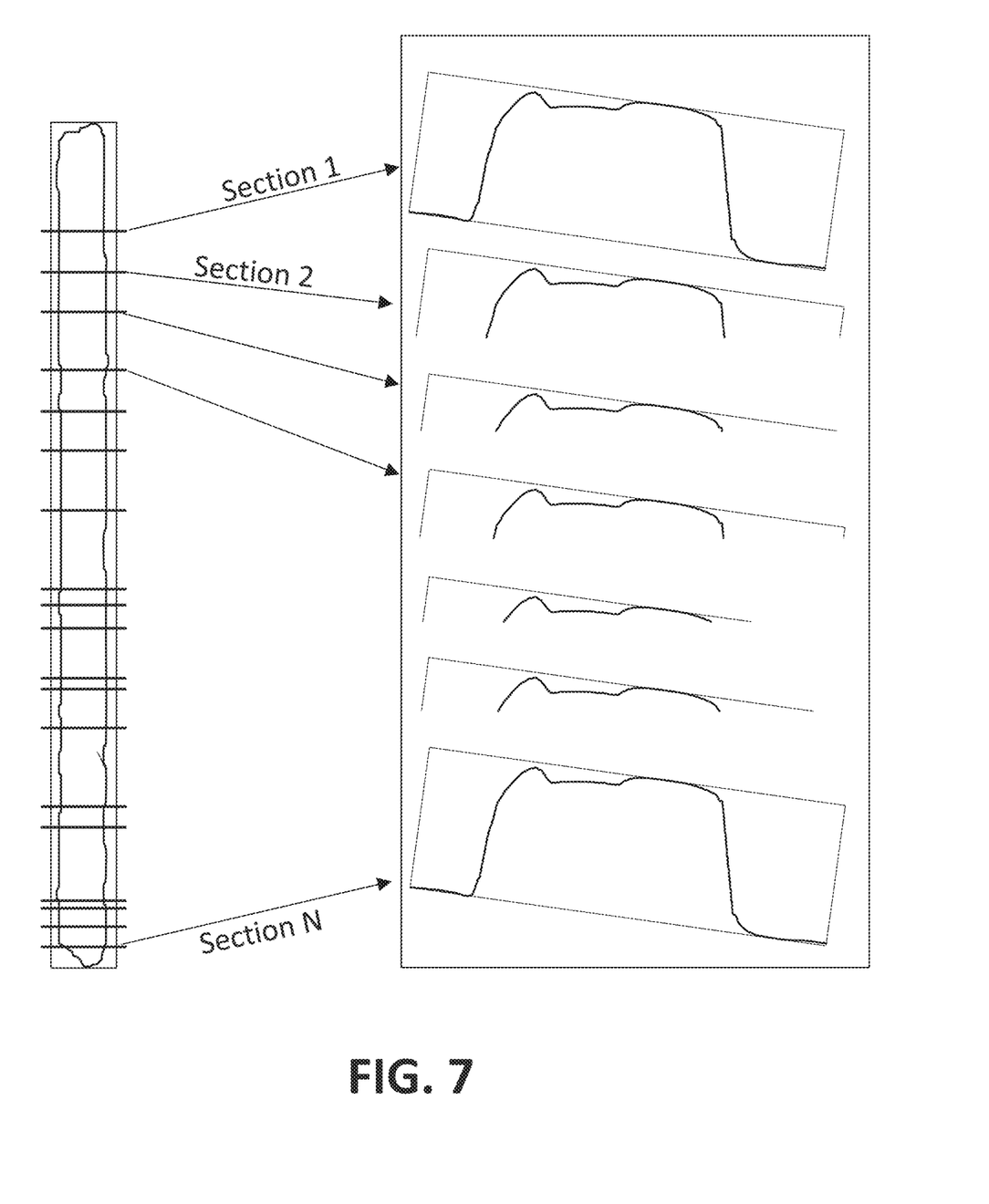
FIG. 7 shows the cuts made in the minima of FIG. 6b and the obtaining of the depth with the height of the rectangle in which the defect is inscribed.

Stage P: defect section at relative minima. The region is sectioned at its minima (the 20 minor ones are selected) using planes perpendicular to the y-axis to obtain the section of the defect in that plane and subsequently be able to calculate its depth (FIG. 7).

Stage Q: Transformations of the sections to obtain the maximum and average depth. In these sections, the depth of the defect is calculated using the height of the rectangle in which the smoothed defect profile is inscribed (FIG. 7); considering the greatest height the maximum depth, and the arithmetic mean of the heights of the rectangles, the mean depth.

In addition, the processor will be able to calculate the real speed of the rod through the timestamps.

Finally, the processor, either by analyzing each of the point clouds given by each acquisition system independently or by unifying all of them in one or two point clouds, will be able to output the following data from the rod: number of defects and length, width, area, maximum depth and location of each of them.

In view of this description and figures, the person skilled in the art will be able to understand that the invention has been described according to some preferred embodiments thereof, but that multiple variations can be introduced in said preferred embodiments, without exceeding the object of the invention such and how it has been claimed.

The invention claimed is:

1. A system for inspection of a surface of a nuclear fuel rod for automatic detection, location and characterization of surface defects, the rod having a longitudinal axis, the system comprising:
   a plurality of point cloud acquisition systems, for obtaining a plurality of profiles, along a Y-axis which coincides with the longitudinal axis of the rod, the profiles defining a point cloud, each acquisition system being composed of:
      a linear laser beam,
      an optical sensor,
      and a point cloud acquisition card;
   wherein the number of acquisition systems, No. Adq. .Syst., is given by the relationship:
      No. Adq.Syst.=f(Ørod)=⌊3+0.1Ørod⌋,
   wherein ⌊ . . . ⌋ denotes rounding to the nearest integer;
   wherein Ørod is the diameter of the nuclear fuel rod to be inspected;
   translation means for the nuclear fuel rod;
   wherein the system also comprises a processor capable of:
      transforming the point cloud into a height map representing a Z coordinate along a Z-axis perpendicular to a Y axis,
      carrying out a local thresholding for a segmentation of the height map, and obtaining a plurality of discontinuities in said map;
      classifying the plurality of discontinuities in different geometric shapes to obtain defects, wherein obtaining the defects comprises obtaining area, length, width, position and orientation of the defects,
      projecting the defects on the Y-axis to obtain a depth of the defects,
      calculating, starting from the projection of the defects on the Y-axis, -an equivalent function and a second derivative thereof to obtain points where the depth of the defect is maximized.

2. The system according to claim 1, wherein the processor, after the transformation into a height map, eliminates voids, noise and/or edges.

3. The system according to claim 1, wherein the processor eliminates discontinuities due to vibrations.

4. The system according to claim 1, wherein the processor calculates whether a mean value of the Z coordinate is above that which the surface of the rod should have, thus identifying and eliminating reflections.

5. The system according to claim 1, wherein the processor, after the transformation into a height map, eliminates voids, noise and/or edges and discontinuities due to vibrations.

6. A method for inspection of a surface of a nuclear fuel rod for automatic detection, location and characterization of defects, comprising the following steps:
   acquisition of point clouds while the fuel rod moves continuously along a Y-axis coinciding with a longitudinal axis of the rod;
   transformation of the point cloud into a height map representing a Z coordinate along a Z-axis which is perpendicular to the Y-axis;
   local thresholding for a segmentation of the height map, and obtaining a plurality of discontinuities in the height map;
   classification of the plurality of discontinuities in different geometric shapes to obtain defects, wherein obtaining the defects comprises obtaining area, length, width, position and orientation, of the defects;
   projection of the defects on the Y-axis to obtain a depth of the defects,
   calculation, starting from the projection of the defects on the Y-axis, of an equivalent function and a second derivative thereof to obtain points wherein the depth of the defect is maximized.

7. The method according to claim 6 further including a step for eliminating voids, noise and/or edges.

8. The method according to claim 7, further including calculating if a mean value of the Z coordinate is above that which the surface of the rod should have, thus identifying and eliminating reflections.

9. The method according to claim 6 further including a step for eliminating discontinuities due to vibrations.

10. The method according to claim 6, further including calculating if a mean value of the Z coordinate is above that which the surface of the rod should have, thus identifying and eliminating reflections.

* * * * *